(12) United States Patent
Rambusch et al.

(10) Patent No.: US 10,766,101 B2
(45) Date of Patent: Sep. 8, 2020

(54) ADHESIVE TAPE AND APPARATUS FOR MAKING SAME

(71) Applicant: certoplast Technische Klebebaender GmbH, Wuppertal (DE)

(72) Inventors: Peter Rambusch, Wuppertal (DE); Rene Rambusch, Wuppertal (DE); Timo Leermann, Wuppertal (DE)

(73) Assignee: certoplast Technische Klebebaender GmbH, Wuppertal (DE)

( * ) Notice: Subject to any disclaimer, the term of this patent is extended or adjusted under 35 U.S.C. 154(b) by 48 days.

(21) Appl. No.: 15/743,514

(22) PCT Filed: Jun. 29, 2016

(86) PCT No.: PCT/EP2016/065199
§ 371 (c)(1),
(2) Date: Jan. 10, 2018

(87) PCT Pub. No.: WO2017/009049
PCT Pub. Date: Jan. 19, 2017

(65) Prior Publication Data
US 2018/0200831 A1 Jul. 19, 2018

(30) Foreign Application Priority Data

Jul. 15, 2015 (DE) .................... 20 2015 103 713 U
Mar. 30, 2016 (DE) .................... 20 2016 101 692 U

(51) Int. Cl.
*B23K 26/08* (2014.01)
*B05C 9/12* (2006.01)
(Continued)

(52) U.S. Cl.
CPC ........ *B23K 26/0846* (2013.01); *B05C 5/0245* (2013.01); *B05C 9/08* (2013.01); *B05C 9/12* (2013.01); *B05D 3/00* (2013.01); *B23K 26/21* (2015.10); *B23K 26/323* (2015.10); *B23K 26/324* (2013.01); *B23K 26/38* (2013.01);
(Continued)

(58) Field of Classification Search
USPC ....................................... 118/37–40, 66, 300
See application file for complete search history.

(56) References Cited

U.S. PATENT DOCUMENTS 4,469,930 A * 9/1984 Takahashi .......... B23K 26/0093
219/121.72
4,776,904 A * 10/1988 Charlton ................. B32B 27/10
156/73.1
(Continued)

FOREIGN PATENT DOCUMENTS

DE        10329994 A    1/2005
DE     202011110445 U   2/2014
(Continued)

*Primary Examiner* — Yewebdar T Tadesse
(74) *Attorney, Agent, or Firm* — Andrew Wilford

(57) ABSTRACT

The invention relates to a device for producing an adhesive tape (2), comprising a supply unit (5) for supplying a strip-type textile carrier (3) of the adhesive tape (2), and a coating unit (6) for applying an at least lamellar adhesive coating (4) to at least one side of the carrier (3). The invention also relates to an ultrasound unit (9 and 10) and/or a laser unit for producing perforations and/or cut edges in the carrier (3).

5 Claims, 1 Drawing Sheet

Figure 1:
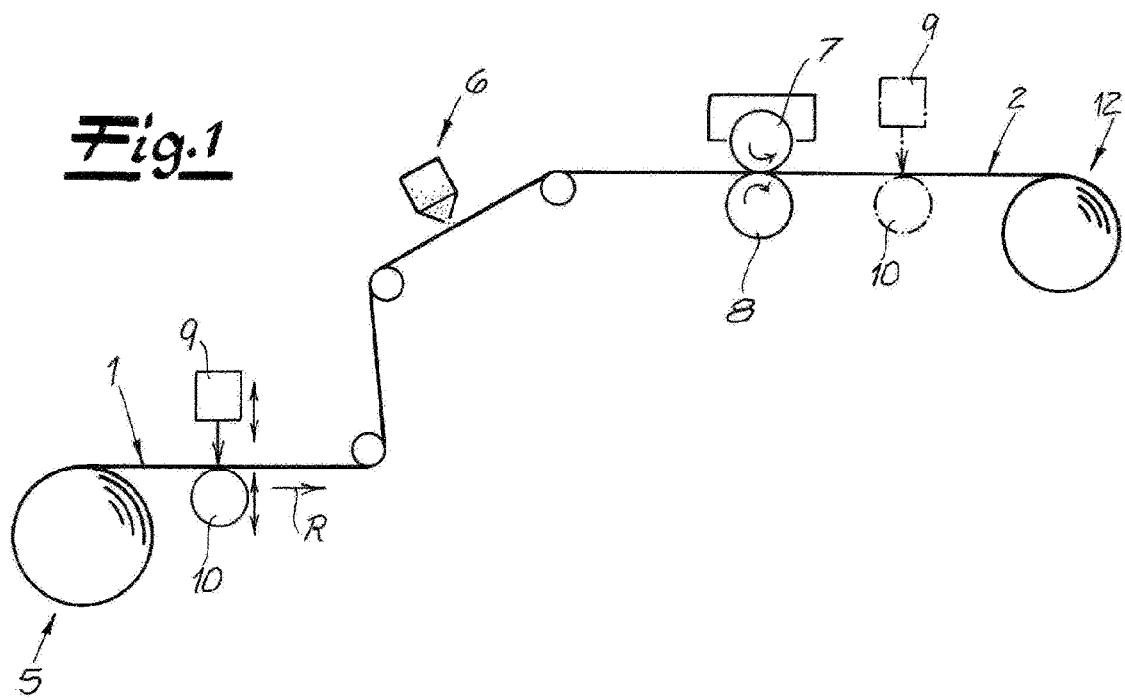

(51) Int. Cl.

| | | |
|---|---|---|
| *B65H 35/02* | (2006.01) | |
| *C09J 7/21* | (2018.01) | |
| *B26D 7/10* | (2006.01) | |
| *B23K 26/21* | (2014.01) | |
| *B23K 26/38* | (2014.01) | |
| *B23K 26/323* | (2014.01) | |
| *B23K 26/324* | (2014.01) | |
| *B60R 16/02* | (2006.01) | |
| *B26D 1/00* | (2006.01) | |
| *B05C 9/08* | (2006.01) | |
| *B05D 3/00* | (2006.01) | |
| *D04H 1/00* | (2006.01) | |
| *D06H 7/22* | (2006.01) | |
| *B05C 5/02* | (2006.01) | |
| *D03J 1/08* | (2006.01) | |
| *D06H 7/00* | (2006.01) | |
| *D06N 3/00* | (2006.01) | |
| *B23K 101/16* | (2006.01) | |
| *B23K 103/00* | (2006.01) | |
| *B23K 103/16* | (2006.01) | |

(52) U.S. Cl.
CPC ............... *B26D 1/00* (2013.01); *B26D 7/10* (2013.01); *B60R 16/0215* (2013.01); *B65H 35/02* (2013.01); *C09J 7/21* (2018.01); *D03J 1/08* (2013.01); *D04H 1/00* (2013.01); *D06H 7/005* (2013.01); *D06H 7/223* (2013.01); *D06N 3/0081* (2013.01); *D06N 3/0088* (2013.01); *B23K 2101/16* (2018.08); *B23K 2103/172* (2018.08); *B23K 2103/42* (2018.08); *B23K 2103/50* (2018.08); *C09J 2201/20* (2013.01); *C09J 2201/28* (2013.01); *C09J 2201/606* (2013.01); *C09J 2203/302* (2013.01); *C09J 2400/263* (2013.01); *D06N 2207/123* (2013.01); *D06N 2213/04* (2013.01)

(56) References Cited

U.S. PATENT DOCUMENTS

| | | | | |
|---|---|---|---|---|
| 5,096,532 | A | * | 3/1992 | Neuwirth ................ B06B 3/00 156/580.1 |
| 5,230,761 | A | | 7/1993 | Crawford |
| 5,403,644 | A | | 4/1995 | Fujisawa |
| 5,948,208 | A | * | 9/1999 | Speich .................. B26D 7/086 156/580.2 |
| 6,936,553 | B2 | | 8/2005 | VonSamsonHimmerstjerna |
| 7,615,128 | B2 | | 11/2009 | Mikkelsen |
| 9,222,002 | B2 | | 12/2015 | Meier |
| 2002/0195478 | A1 | * | 12/2002 | Yamano ................ B29C 65/08 228/110.1 |
| 2006/0011285 | A1 | * | 1/2006 | Suda .................... B29D 30/305 156/117 |
| 2006/0073311 | A1 | * | 4/2006 | Hogg .................... B29C 70/386 428/174 |
| 2007/0184736 | A1 | | 8/2007 | Seitz |
| 2012/0238172 | A1 | * | 9/2012 | Siebert ................... B32B 5/022 442/334 |
| 2013/0273333 | A1 | | 10/2013 | Meier |
| 2014/0141159 | A1 | * | 5/2014 | Meier ....................... C09J 7/20 427/208 |
| 2015/0298422 | A1 | * | 10/2015 | Lodde ..................... B32B 5/00 428/193 |

FOREIGN PATENT DOCUMENTS

| | | |
|---|---|---|
| EP | 0534300 A | 12/1997 |
| EP | 1108769 A | 3/2004 |

* cited by examiner

ADHESIVE TAPE AND APPARATUS FOR MAKING SAME

CROSS REFERENCE TO RELATED APPLICATIONS

This application is the US-national stage of PCT application PCT/EP2016/065199 filed 29 Jun. 2016 and claiming the priority of German patent application 202015103713.9 itself filed 15 Jul. 2015 and German patent application 202016101692.4 itself filed 30 Mar. 2016.

FIELD OF THE INVENTION

The invention relates to an apparatus for making adhesive tape, particularly a tape for wrapping an elongated object, preferably a tape for wrapping cable sets in automobiles, with a supply for feeding a ribbon-shaped textile substrate of the adhesive tape, and with a coater for applying an at least strip-shaped adhesive coating to at least one face of the substrate. Moreover, the invention relates to an adhesive tape that can be manufactured in exemplary fashion using such an apparatus, particularly a wrapping tape for wrapping an elongated object, preferably a wrapping tape for wrapping cable sets in automobiles, with a ribbon-shaped substrate, and with an at least strip-shaped adhesive coating on at least one face of the substrate, with the substrate being provided with at least one cut edge and/or perforation.

BACKGROUND OF THE INVENTION

An apparatus for making an adhesive tape having the above-described design is described in EP 1 108 769, for example. In that document, a substrate made of a nonwoven material is used that is provided with perforations. These perforations enable the adhesive tape manufactured in this manner to be torn in desired places. The perforations are made by thermal bonding.

Adhesive tapes and particularly wrapping tapes having the above-described construction are typically used to encase cable sets in automobiles. This is described in detail in DE 103 29 994, for example. A comparable approach constitutes subject matter of WO 2012/048912 [US 2013/0273333]. In both cases, the substrate is provided with one or more adhesive strips that cover only a fraction of the surface of the substrate.

The manufacture of adhesive tapes with strip-shaped adhesive coating is described in the applicant's application WO 2013/024150 [U.S. Pat. No. 9,222,002], for example. In that application, the process is typically such that the substrate strip made of the textile material is first unwound from the supply and then fed to the coater. With the aid of coater, one or more adhesive strips are produced on the substrate strip in its longitudinal extension by coating with an adhesive. Finally, the substrate strip is subdivided longitudinally into the individual adhesive tapes.

During the cutting operation, which can be performed with the aid of rotary cutters or also subsequently, so-called fraying can occur at the longitudinal edges or transverse edges and thus reach the cut edges. Such fraying or even yarn pull-out in ribbon-shaped textile substrates, which are made of nonwoven fabric or a woven fabric, for example, are sometimes only observed during use, that is during the wrapping of an elongated object. This can result in problems in the manufacture of a tubular sheath using the adhesive tape in question, or work is rendered utterly and excessively difficult.

It is true that the above-described prior art does typically work with rotary cutters that ensure a clean cut at the cut edges. What is more, the adhesive coating often ensures that the above-described fraying does not occur, at least not if the adhesive coating reaches to the longitudinal or transverse edge in question. However, since work is increasingly performed using strip-shaped adhesive coatings that do not cover the entire face of the substrate, the longitudinal edges are often free of the adhesive coating. As a result, the described fraying can occur at the longitudinal edges. Comparable fraying is sometimes also observed in perforations. To date, the prior art has not made any compelling solutions available in this regard.

OBJECT OF THE INVENTION

For this reason, the object of the invention is to further develop such an apparatus for making an adhesive tape such that flawless cut edges and perforations are observed. In particular, the fraying that often occurs in practice in ribbon-shaped textile substrates is to be eliminated. Moreover, a commensurately configured adhesive tape is to be created.

SUMMARY OF THE INVENTION

In order to attain this object, an apparatus for making an adhesive tape of this generic type is characterized in the context of the invention in that, in addition to the supply and the coater, an ultrasound and/or a laser device is provided for the purpose of producing perforations and/or cut edges in the substrate.

The ultrasound device typically works with a sonic blade and an oppositely situated anvil. The substrate is passed between the sonic blade and the anvil. The anvil consistently oscillates at above 20 kHz. As a matter of principle, the sonic blade can also oscillate. It is also conceivable for both the anvil and the sonic blade to be excited so as to oscillate, which will be described in detail below.

The preferred variant pursued in the context of the invention with the anvil or sonic anvil offers the advantage that, in this case, a plurality of appropriately configured ultrasound devices can be arranged next to one another and work with a single anvil or sonic anvil. That is, it is sufficient in this case for the corresponding anvil or sonic anvil to be excited to oscillation. In contrast, the opposing sonic blades generally do not oscillate. This reduces the mechanical complexity and expense, because only one excitation device is required for the continuous anvil or sonic anvil.

The so-called inverse piezoelectric effect, or electrostriction, is usually used to produce oscillations in the sonic blade and optionally in the anvil. In other words, in this case, the ultrasound device is equipped with a high-frequency generator whose alternating voltage that is generated on the output side is connected to a ceramic or quartz crystal plate. As a consequence of this, the ceramic or quartz crystal plate produces the oscillations at a corresponding frequency.

Insofar as the quartz crystal plate or ceramic plate in question defines the sonic blade and/or is coupled with the sonic blade, the sonic blade can also be caused to oscillate accordingly. Since the amplitudes of the oscillations generally lie in the range of micrometers, sonotrodes are usually required as sonic blades in order to generate larger amplitudes. The oscillations in question are typically present as mechanical longitudinal waves that are reflected at the free end of the sonotrode. The length of the sonotrode is then set up such that it is a multiple of half of the wavelength of the oscillation, so that a standing wave is produced within the sonotrode and thus the sonic blade.

In any event, the ultrasound device with the sonic blade and the oppositely situated anvil is capable of cutting the textile substrate strip in question in a longitudinal direction, for example, with lesser cutting forces than those required when using a conventional cutting blade. As will readily be understood, the ribbon-shaped textile substrate can also be cut in the transverse direction with the aid of the ultrasound device. Moreover, the ultrasound device can be used according to the invention in such a way that small cuts with interruptions are made and the desired perforations are thereby formed in the substrate.

In all of these cases, the cut edge or perforation is generally welded at the same time. Without exception, neither burnt edges nor combustion gases are produced. Compared to water-jet cutting, which is certainly also possible in principle but is not claimed, the inventive use of the ultrasound device and/or the laser device is generally associated with the advantage that, in both cases, the penetration of moisture into the substrate strip or the substrate made out of it is ruled out. That is, elaborate drying methods can be omitted. What is more, both ultrasound (cutting) units and laser devices can be produced in an especially simple and cost-effective manner these days.

The laser (beam) unit is generally an infrared laser, which generally operates in pulse mode. The laser beam emitted from the laser in question can be deflected using movable mirror elements and guided over the substrate strip. Optics are also usually provided for focusing. In this way, the ribbon-shaped textile substrate can be optionally provided with the desired cut edges in the longitudinal and/or transverse direction and optionally with the perforations. At the same time, the infrared laser that is advantageously used here generally ensures that the cut edges and/or perforations undergo the desired additional welding. When applied to the perforations, this means that the perforations, which are usually implemented as short cuts, have practically no or only slight fraying at their edges. The infrared laser used is generally a $CO^2$ laser. In principle, however, an Nd:YAG laser can also be used. The intensity or duration of the radiation can be adjusted and/or timed such that burnt edges are not observed overall.

The ultrasound device and/or the laser device are generally embodied so as to be adjustable relative to the substrate that is passing through. For the most part, the adjustment can be performed perpendicular to the feed direction of the substrate. This makes it possible to selectively place the ultrasound device and/or the laser device on the substrate and to then move them away from the substrate. Moreover, the ultrasound device and/or the laser device can usually also be adjusted in the feed direction and/or transverse to the feed direction. The ability to make adjustments transverse to the feed direction of the substrate opens up the possibility of cutting the substrate in the transverse direction with the aid of the ultrasound device and/or laser device. Corresponding perforations can also be made in this way in the same direction.

What is more, it has proven to be advantageous if the ultrasound and/or the laser device is arranged upstream of the coater in the feed direction of the substrate. That is, the ribbon-shaped textile substrate is first cut and/or perforated and only then coated with the adhesive in the coater. Such an approach is advantageous especially if the adhesive coating is applied only in strips to the corresponding coated face of the substrate and not over the entire surface, for example. The cut edges or perforations then remain substantially free of adhesive.

If the adhesive is applied to the entire surface of the coated face, it is also possible to place the ultrasound device and/or the laser device downstream of the coater in the feed direction of the substrate. As will readily be understood, this procedure can also be used if the coater is used only to apply a strip coating of the adhesive to the coated face of the substrate.

The ultrasound and/or the laser device can be provided with an additional edge welder. This edge welder provides for additional welding of the cut edge and/or of the perforation or perforation edges. In general, however, such an edge welder is unnecessary, because both the ultrasound device and the laser device automatically provide for additional welding of the cut edge and/or the perforation edges during the cutting and/or perforation process. In this sense, both the ultrasound and the laser device operate in the manner of a combined welding/cutting process or as a combined welder/cutter.

This combined welding/cutting process is substantially contactless. After all, neither the laser device nor the ultrasound device exerts pressure on the substrate. Insofar as the ribbon-shaped textile substrate or a substrate strip for the manufacture thereof has the previously applied strip-shaped adhesive coating, the desired adhesive tape is already completely finished after the described and combined welding/cutting process and is available for immediate further processing.

The ribbon-shaped textile substrate for making the adhesive tape is generally produced from the substrate strip. The substrate strip comes from the supply. In order to produce the substrate, the substrate strip is usually subdivided longitudinally into the individual adhesive tapes. The cut edges produced in this way are thus longitudinal cut edges, that is, longitudinal wheels of the ribbon-shaped textile substrate manufactured in this way. The cut edge in question is simultaneously welded by the ultrasound device and/or laser device. Possible fraying or yarn pull-out is thus reliably avoided in this way.

The ribbon-shaped textile substrate used in the context of the invention is a substrate manufactured from a textile base material. This textile base material is a web material that has been woven, warp-knitted, braided, or otherwise joined together. These also include fleeces or nonwoven fabrics. This means that the invention includes textile substrates that are embodied as a weave as well as those made of a nonwoven fabric, for example. Moreover, textile substrates made of a mesh product, netting, stitch-bonded fabric, etc. can also be used. Textile substrates are also conceivable that were manufactured from combinations thereof, such as from a woven and also a nonwoven as a laminate.

Furthermore, the ribbon-shaped textile substrate can be provided with additional coatings besides the adhesive coating. It has proven to be especially expedient if a hot melt adhesive or acrylate adhesive is applied as the adhesive coating. After all, this can be applied to the ribbon-shaped textile substrate without any difficulty with at least one nozzle. Moreover, such a hot melt adhesive can be applied especially easily and inexpensively to the substrate in strip form.

The additional possible coatings can be a paint coating, a foam coating, a film coating, etc. What is more, the textile substrate in question is also and preponderantly constructed and/or manufactured from thermoplastic fibers. In principle, however, natural fibers such as cotton fibers, for example, can also be used. In that case, however, care must be taken that the part by weight of plastic fibers is predominant.

After all, the procedure according to the invention is such that the textile substrate in question undergoes the above-described additional welding at least in the region of the responsible cut edge and/or in the region of the perforation. The plastic fibers present in the textile substrate are melted on in this context. A more or less smooth cut edge and/or perforation edge is thus produced. That way, there is no danger of yarn pull-out or fraying. The welding-on of the plastic fibers in question can be achieved in an especially simple manner, because the plastics used for the manufacture of the textile substrate typically have melting temperatures in the range from about 100° C. to a maximum of 300° C. and preferably in the range from 80° C. to 200° C.

Through the use of the laser and/or the ultrasound device, an adhesive tape is produced overall with the aid of the described apparatus that has at least one cut edge or perforation or perforation edge that is also welded. The invention proceeds here from the realization that temperatures are inevitably produced during ultrasound cutting that exceed the melting temperature of the plastic fibers of the ribbon-shaped temperature substrate used at least in the region of the cut edge or perforation. This results in the desired additional welding of the cut edge. The same applies accordingly to the laser device.

In this way, the cut edges can be defined both in the longitudinal and in the transverse direction without fraying. The same applies accordingly to the perforations formed into the substrate. In this case, the perforation edges that are necessarily formed during perforation are also welded. In this case as well, the invention exploits the fact that, during the application of such perforations with the aid of the ultrasound device (laser device), not only small cuts are produced in the longitudinal or transverse direction in the substrate, but rather the perforation edges bordering these perforation cuts or perforation incisions are simultaneously welded with the aid of the ultrasound device (laser device).

Fraying is thus prevented in this area, so that the adhesive tape produced in this way can be easily torn along the perforations or perforations cuts, for example. For example, it has proven expedient in this connection to form the perforations or perforation cuts in question into the substrate in regular intervals transverse to the longitudinal extension. The adhesive tape produced in this way can thus be torn crossways without difficulty, particularly by hand. This is true even of adhesive tapes with substrates or made of substrate materials that would not otherwise be manually tearable.

In fact, the observed manual tearability is generally such that transverse tearing forces of 10 N/cm or less are observed. These transverse tearing forces can also be observed according to the invention in substrates that are not manually tearable (without perforations). The invention achieves this through the perforations or perforation cuts that are also formed in the transverse direction of the substrate. If the perforations have been formed into the substrate continuously in the transverse direction of the substrate and at a short distance from one another, a multitude of possible transverse tear lines are subsequently available in the adhesive tape manufactured in this way. The same advantages and effects are observed in a case in which the laser device is used alternatively or in addition to the ultrasound device. Herein lie the fundamental advantages.

BRIEF DESCRIPTION OF THE INVENTION

Figure 2:
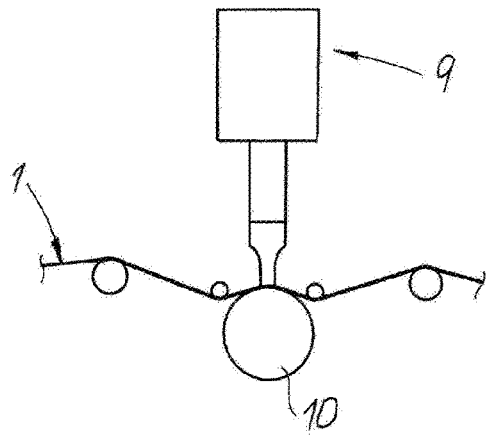
Figure 3:
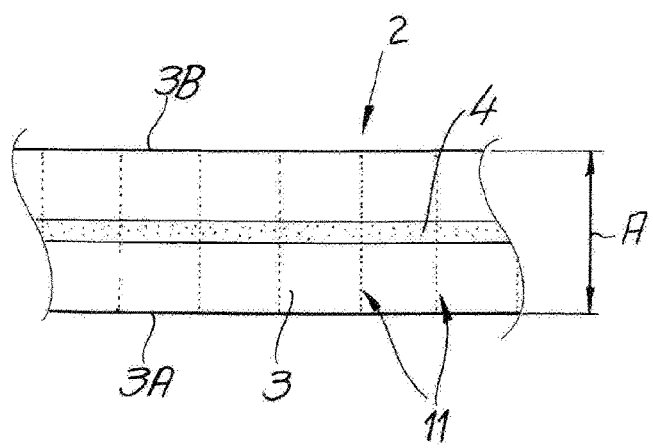

The invention is explained in further detail below with reference to a schematic drawing showing only one embodiment:

FIG. 1 shows an apparatus according to the invention for making an adhesive tape, FIG. 2 is a detailed view of the ultrasound device, and FIG. 3 is a top view of the adhesive tape manufactured with the aid of the apparatus according to FIGS. 1 and 2.

SPECIFIC DESCRIPTION OF THE INVENTION

FIGS. 1 and 2 show an apparatus that produces at an outlet end one or more adhesive tapes 2 from a substrate strip 1. The adhesive tape 2 is illustrated in principle in a top view according to FIG. 3. The substrate strip 1 is a laminar textile web and can be cut in its longitudinal direction into a plurality of the adhesive tapes 2, as will be explained in detail below. In order to define the individual adhesive tapes 2 for this purpose, the substrate strip 1 is longitudinally subdivided into substrate pieces 3.

The adhesive tape 2 has in its inherent structure the above-mentioned substrate piece 3 and at least one adhesive strip 4 or strip-shaped adhesive coating 4 that is applied to the substrate piece 3. The adhesive coating 4 is applied to at least one face of the substrate piece 3. In the context of the embodiment according to FIG. 3, the adhesive strip 4 is provided only on one top face of the substrate piece 3 as the coated face. As a matter of principle, an additional an adhesive strip 4 can also be applied to the bottom side or to both sides. It lies within the scope of the invention to work with an adhesive strip 4 that covers only a portion, for example up to 50% of the coated face of the substrate piece 3. The coated face of the substrate piece 3 can also be provided with the adhesive strip 4 over its entire surface.

The substrate piece 3 and, consequently, the substrate strip 1 defining the substrate piece 3, is a ribbon-shaped textile substrate piece 3. The ribbon-shaped textile substrate piece 3 can be made of a woven or nonwoven fabric. Plastic fibers are preponderantly used as the material for the substrate piece 3. In principle, a substrate piece 3 that is made of a laminate consisting of a woven fabric and a nonwoven fabric can also be used. Here, the weight per unit area of the substrate piece 3 lies in the range between 100 g/m$^2$ to 300 g/m$^2$. Even greater weights per unit area are also conceivable in principle.

The adhesive strip 4 applied to the coated face of the substrate piece 3 with the aid of a so-called acrylate-based hot melt adhesive or melt adhesive composition. A coater 6, which will be described in further detail below, is provided for this purpose. The coater 6 may be provided with a mask or an appropriately shaped nozzle in order to define the adhesive strip 4 on the coated face of the substrate piece 3 shown in FIG. 3.

The substrate strip 1 is fed from a supply 5 with the aid of the apparatus according to FIG. 1. In the illustrated embodiment of FIG. 1, the substrate strip 1 is first perforated in the by an ultrasound device 9, 10, then coated and subsequently cut into the individual adhesive tapes 2. The perforation with the aid of the ultrasound device 9, 10 can also occur after cutting. The two basic positions of the ultrasound device 9, 10 are shown in FIG. 1. Generally, the procedure is such that the ultrasound device 9, 10 is arranged upstream of the coater 6 or nozzle in order to form the perforations into the substrate strip 1 in the feed direction R of the substrate strip 1 indicated by an arrow in FIG. 1. That is why the ultrasound device 9, 10 is shown with solid lines in this position, whereas the other, second optional position of the ultrasound device 9, 10 after the cutting of the substrate strip 1 into the adhesive tapes 2 is shown with dot-dash lines. In this case, the ultrasound device 9, 10 is located downstream of the coater 6 in the feed direction R of the substrate piece 3.

In general, however, it is also possible for the perforation and coating on the one hand and the cutting of the perforated and coated substrate strip 1 on the other hand to take place in separate apparatuses. Even having a perforation that is first made on the one hand and the subsequent coating and cutting into the adhesive tapes 2 on the other hand be performed in separate apparatuses is also expressly covered by the invention.

The supply 5 is generally a supply roll on which the substrate strip 1 is wound. The substrate strip 1 is configured as a flat textile web that is or can be embodied here as a woven web, nonwoven web, etc., or also as a combined laminate of woven/nonwoven fabric. Moreover, it lies within the scope of the invention to provide the substrate strip 1 with an additional coating, a paint coating, a film coating, etc., in addition to the adhesive strip 4. That is not shown in detail, however.

The substrate strip 1 has a total width that is or can be a multiple of the total width A of the adhesive tape 2 shown in FIG. 3. In fact, the substrate strip 1 can have a width of 3A to 20A, with A being the width of the adhesive tape 2.

Starting from the supply 5, the substrate strip 1 is first fed to the ultrasound device 8, 9. Here, perforations are formed in the substrate strip 1 with the aid of the ultrasound device 8, 9. Here, and without it constituting a restriction, these perforations are transverse perforations. These transverse perforations can be seen in FIG. 3 in the top view of the adhesive tape 2 through transverse perforation lines 11. With the aid of these transverse perforation lines 11, more particularly the transverse perforations, it is possible to configure an adhesive tape 2 to be manually tearable that would not otherwise be manually tearable, which means in the context of the invention that total transverse tearing forces of no more than 10 N/cm are required in order to tear the adhesive tape 2 transversely.

With the aid of the ultrasound device 9, 10, these transverse perforations or the corresponding transverse perforation lines 11 are formed into the substrate piece 3 or substrate strip 1 in regular intervals transverse to the feed direction R of the substrate piece 3 or substrate strip 1. To achieve this, it is possible to use a plurality of ultrasound devices 9, 10 that are arranged transverse to the substrate piece 3 or substrate strip 1. It is also possible, however, to use one (single) ultrasound device 9, 10 that moves transversely to the feed direction R of the substrate piece 3 or substrate strip 1 in order to form the transverse perforations. In other words, the ultrasound device 9, 10 is designed to be displaceable relative to the substrate piece 3, as the corresponding arrows indicate in FIG. 1. Not only is displacement perpendicular to the substrate piece 3 possible, but rather also transverse to the substrate, which results in three-dimensional displacement overall. The ultrasound device 9, 10 is composed of a blade or sonic blade 9 and an oppositely situated anvil 10. The anvil 10 is usually a sonic anvil, which means that the anvil 10 is oscillated. The substrate piece 3 or substrate strip 1 is passed between the sonic blade 9 and the anvil or sonic anvil 10.

Since the sonic blade 9 and/or the anvil or sonic anvil 10 is typically excited to oscillations having a frequency above 20 kHz, corresponding frequencies are not audible on the one hand and, on the other hand, are set up such that minimal surface friction occurs between the sonic blade 9 and the substrate strip 1 or substrate piece 3. As a result of this minimal surface friction, the substrate strip 1 is cut open or cut into. A perforation cut is made. Movement of the ultrasound device 9, 10 transverse to the feed direction R forms a plurality of these perforation cuts in regular intervals in the substrate piece 3 or substrate strip 1, whereby the transverse perforations shown in FIG. 3 or a plurality of these transverse perforation lines 11 are created.

By virtue of the fact that the sonic blade 9 performs the above-described oscillations in the ultrasonic range, the substrate strip 1 or substrate piece 3 is heated in the contact region between the sonic blade 9 and the textile material in question. Since the substrate strip 1 and hence the substrate piece 3 is constructed preponderantly from plastic fibers, the plastic fibers in question are melted at least in the area of the perforation edges surrounding the perforations or perforation cuts at the temperatures produced as a result of the surface friction. The invention proceeds here from the realization that the acoustic energy that is available during the formation of the perforations or in the individual perforation cuts as a result of the oscillation of the sonic blade 9 is sufficient to heat the perforation edge in the region of the individual perforation cuts and thus provide for the desired welding at the perforation edge.

In the same way, the ultrasound device 9, 10 can also be used alternatively or in addition in order to produce the individual adhesive tapes 2 by cutting the coated substrate strip 1 longitudinally. In this case, the ultrasound device 9, 10 replaces a cutting apparatus 7, 8 shown in the context of FIG. 1 which is composed here of a rotating blade 7 and an associated oppositely situated anvil 8. Generally, a plurality of these rotating blades 7 and associated anvils 8 are provided, namely at a regular spacing from one another that corresponds to the width A of the adhesive tape 2 after the cut in the embodiment. If the ultrasound device 9, 10 is used here, longitudinal cuts are produced with it, and the cut edges on the associated longitudinal edge 3A, 3B of the adhesive tape 2 are heated by the described surface friction. As was already explained relative to the perforation cuts and the transverse perforation lines 11 that are produced, it also happens in like manner that, during a cut with the aid of the ultrasound device 9, 10, the cut edges in question are welded at the longitudinal edges 3A, 3B.

As already explained above, the sonic blade 9 of the ultrasound device 9, 10 oscillates ultrasonically. Alternatively or in addition, the oppositely situated anvil or sound anvil 10 can be excited to oscillate ultrasonic oscillations. In this case, the sonic anvil 10 in question is also caused to perform ultrasonic oscillations beyond the audible limit. It is then possible to even dispense with the vibrating of the sonic blade 9. As will readily be understood, the invention also includes variants in which both the sonic blade 9 and the sonic anvil 10 each oscillate ultrasonically.

Since the substrate strip 1 is constructed preponderantly from plastic fibers in that the plastic fibers in the substrate strip 1 amount to greater than 50% by weight (wt %), the heating produced with the aid of the ultrasound device 9, 10 at the cut edge or perforation edge ensures that individual plastic fibers melt at least partially. The substrate piece 3 is thus sealed in the region of the cut edge at the longitudinal edges 3A and 3B of the substrate piece 3 and at the perforation edge. The cut edge or perforation edge is thus prevented from fraying. This facilitates the subsequent processing and manufacture of the adhesive tapes 2.

Downstream of the ultrasound device 9, 10 and the formation of the transverse perforations, the perforated substrate strip 1 is guided over one or more deflection rollers until it reaches the above-mentioned coater 6 and passes through it. Here, the coater 6 is merely a nozzle that applies the one adhesive strip 4 depicted in FIG. 3 to the coated face of the substrate piece 3 or substrate strip 1. It will readily be understood that more than one nozzle can also be used in the coater 6.

FIG. 1 shows that the coater 6 or nozzle extends transversely of the feed direction R and the longitudinal extension of the substrate strip 1. Moreover, the substrate strip 1 is guided vertically or nearly vertically in the vicinity of the coater 6 or nozzle. This is obviously only for the sake of example and not mandatory. The inclined or vertical orientation of the substrate strip 1 in the vicinity of the coater 6 enables the particularly exact application of the adhesive strip 4. After all, the invention also make use here of gravitational forces of the melt adhesive composition as it usually leaves the nozzle. That is, the melt adhesive composition in question can be applied onto the coated face of the substrate piece 3 or, in this case, onto the substrate strip 1 with an exactly defined edge and ultimately without lateral raggedness.

In any case, the substrate strip 1 passes through the coater 6 or nozzle, so that the adhesive emerging from the nozzle forms the adhesive strip 4 shown in FIG. 3 or several of these adhesive strips 4 on the substrate strip 1.

After the adhesive strip 4 shown in FIG. 3 has been applied to the coated face of the substrate piece 3 or substrate strip 1 for each adhesive tape 2 of width A to be produced subsequently, the substrate strip 1 passes through the above-mentioned cutting apparatus 7, 8 with the plurality of adhesive strips 4 corresponding to the number of adhesive strips 2 to be produced subsequently. Here, the cutting apparatus 7, 8 is a cutter bar with a plurality of rotating blades 7 in its longitudinal extension and transverse to the substrate strip 1 that is passing through. The rotating blades 7 are spaced apart by the distance A, which corresponds to the width A of the adhesive tapes 2 to be subsequently produced therefrom.

With the aid of the rotating blades 7, the substrate strip 1 is cut in the longitudinal direction and in the feed direction R into the individual adhesive tapes 2. An anvil 8 that is situated opposite the center substrate strip 1 is associated for this purpose with each rotating blade 7. The anvil 8 may rotate contrary to the blade 7, as corresponding arrows indicate in FIG. 1. The rotating blade 7 can thus pass through the substrate strip 1, thus producing the cut edges at the two longitudinal edges 3A, 3B, which cut edges can fray when the blades 7 and anvils 8 are used. If, however, the ultrasound device 9, 10 is used as shown instead of the cutting apparatus 7, 8, then the longitudinal edges 3A, 3B of the ribbon-shaped substrate piece 3 are also welded. In other words, the ultrasound device 9, 10 used in place of the cutting apparatus 7, 8 is a combined welder/separator 7, 8.

After the substrate strip 1 has been subdivided longitudinally into the individual adhesive tapes 2 in this way, the individual adhesive tapes 2 can be wrapped onto a roll 12. This may be a so-called turret winder that is constructed and works in a manner comparable to the description given in the applicant's WO 2013/024150.

In any case, the substrate strip 1 is manufactured at high speed and provided with smooth and clean cuts in the longitudinal direction and transverse perforation lines 11. The cut edges and perforation edges are simultaneously welded and sealed or melted by ultrasound. This ensures that the cut edges or perforation edges do not fray. In adaptation to the application, cutting can be performed vertically, horizontally, or continuously with appropriate sonotrodes for the sonic blade 9 used. The same advantages and effects are observed if a laser device is used in place of the ultrasound device 9, 10. That is not shown, however.

Moreover, the invention relates to a method of making an adhesive tape 2, particularly a wrapping tape for wrapping an elongated object, preferably a wrapping tape for wrapping cable sets in automobiles, according to which the ribbon-shaped textile substrate piece 3 is fed from a supply 5 and, with the aid of a coater 6, subsequently provided with an at least strip-shaped adhesive coating 4 on at least one face of the substrate piece 3, and according to which, in accordance with the invention, the ultrasound device 7, 8 and/or the laser device provides for the creation of perforations and/or cut edges in the substrate piece 3.

The invention claimed is:

1. An apparatus for making an adhesive tape, the apparatus comprising:
   a supply for feeding a ribbon-shaped textile substrate strip of thermoplastic fibers in a longitudinal feed direction along a path;
   a coater downstream of the supply along the path for applying a strip-shaped adhesive coating to at least one face of the substrate strip;
   an ultrasound or laser device provided between the supply and the coater and movable in three dimensions, transversely and longitudinally of the longitudinal feed direction and also toward and away from the moving web for forming longitudinal and transversely extending rows of perforations and/or cut edges in the moving substrate strip; and
   a cutter downstream of the coater for cutting the perforated/cut and coated strip into a plurality of longitudinally extending tapes.

2. The apparatus defined in claim 1, wherein the ultrasound device is provided with a sonic blade and an oppositely situated anvil between which the substrate strip is passed, the blade and the anvil being movable transversely of the moving strip during movement of the strip past the ultrasound device.

3. The apparatus defined in claim 2, wherein at least the anvil oscillates above 20 kHz.

4. The apparatus defined in claim 1, wherein the ultrasound or laser device is an edge welder.

5. The apparatus defined in claim 1, wherein the ultrasound or laser device is a combined welder/cutter.

\* \* \* \* \*